United States Patent
Naito et al.

(10) Patent No.: US 8,874,358 B2
(45) Date of Patent: Oct. 28, 2014

(54) ROUTE GUIDANCE DEVICE, METHOD, AND PROGRAM

(75) Inventors: Takashi Naito, Okazaki (JP); Takashi Hayashi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 425 days.

(21) Appl. No.: 12/654,690

(22) Filed: Dec. 29, 2009

(65) Prior Publication Data

US 2010/0185384 A1 Jul. 22, 2010

(30) Foreign Application Priority Data

Jan. 20, 2009 (JP) ................................ 2009-009832

(51) Int. Cl.
- G01C 21/00 (2006.01)
- G01C 21/34 (2006.01)
- G01C 21/26 (2006.01)

(52) U.S. Cl.
CPC ............ G01C 21/3469 (2013.01); G01C 21/34 (2013.01); G01C 21/26 (2013.01)
USPC ............. 701/200; 701/22; 701/201; 701/211; 318/66; 417/22; 60/615; 180/65.25

(58) Field of Classification Search
USPC ......... 701/22, 23, 25, 99, 200, 201, 209, 211; 318/66; 417/22; 60/615; 180/65.25
See application file for complete search history.

(56) References Cited

U.S. PATENT DOCUMENTS

| | | | | |
|---|---|---|---|---|
| 5,815,824 A | * | 9/1998 | Saga et al. | 701/22 |
| 6,314,347 B1 | * | 11/2001 | Kuroda et al. | 701/22 |
| 2002/0152018 A1 | * | 10/2002 | Duckeck | 701/201 |
| 2004/0153241 A1 | * | 8/2004 | Suzuki | 701/211 |
| 2005/0057200 A1 | * | 3/2005 | Akiyama | 318/66 |
| 2006/0239828 A1 | * | 10/2006 | Igarashi et al. | 417/22 |
| 2009/0094980 A1 | * | 4/2009 | Sawada et al. | 60/615 |
| 2009/0277701 A1 | * | 11/2009 | Soma et al. | 180/65.25 |

FOREIGN PATENT DOCUMENTS

| | | |
|---|---|---|
| CN | 1521068 A | 8/2004 |
| JP | A-07-107617 | 4/1995 |
| JP | A-2000-333305 | 11/2000 |
| JP | A-2006-115623 | 4/2006 |
| JP | A-2008-087516 | 4/2008 |
| JP | A-2008-249588 | 10/2008 |
| WO | WO 2008/041471 A1 | 4/2008 |

OTHER PUBLICATIONS

Jul. 3, 2012 European Search Report issued in EP 10 00 0276.
Japanese Patent Office, Notification of Reasons(s) for Refusal mailed Apr. 10, 2012 in Japanese Patent Application No. 2009-009832 w/Partial English-language Translation.
Chinese Patent Office, Search Report dated May 14, 2013 in Chinese Patent Application No. 2010100023753 w/English-language Translation.

* cited by examiner

*Primary Examiner* — James Trammell
*Assistant Examiner* — Sanjeev Malhotra
(74) *Attorney, Agent, or Firm* — Oliff PLC

(57) ABSTRACT

Route guidance devices, methods, and programs provide guidance for a vehicle that is provided with a drive motor and an engine as drive sources. The devices, methods, and programs acquire a departure point and a destination for the vehicle and specify one or more motor drive recommended links for which driving with the drive motor as the drive source is recommended. The devices, methods, and programs specify a route that includes only motor drive recommended links and by which the vehicle can drive from the departure point to the destination using only the drive motor as the drive source and output the specified route on a display.

14 Claims, 9 Drawing Sheets

EV DRIVING RATIO = 60% ately, in the related art, a route from a departure point to a destination is searched, the planned driving route that is located is divided into a plurality of segments, and a control schedule is generated in which a segment in which the operating efficiency becomes good if the vehicle drives using the engine as the drive source is set as a segment in which the engine is used as the drive source for driving, and a segment in which the operating efficiency becomes poor if the vehicle drives using the engine as the drive source is set as a segment in which the motor is used as the drive source for driving.

ROUTE GUIDANCE DEVICE, METHOD, AND PROGRAM

INCORPORATION BY REFERENCE

The disclosure of Japanese Patent Application No. 2009-009832, filed on Jan. 20, 2009, including the specification, drawings and abstract is incorporated herein by reference in its entirety.

BACKGROUND

1. Related Technical Fields

Related technical fields include route guidance devices, methods, and programs that provide guidance for a driving route that is suitable for a vehicle to drive from a departure point to a destination.

2. Related Art

Recent years have seen the emergence of the electric vehicle, in which a motor that is driven based on electric power supplied from a battery serves as the drive source, the hybrid vehicle in which both a motor and an engine serve the drive sources, and similar vehicles, in addition to the gasoline vehicle in which an engine serves as the drive source.

Further, in the known hybrid vehicle that is described above, a control schedule for the motor and the engine is generated with respect to a planned driving route.

In this case, it is an object of related art pertaining to generation of the control schedule, as described in Japanese Patent Application Publication No. JP-A-2000-333305 (pages 4 to 6 and FIGS. 3 to 6), for example, to reduce the amount of fuel that is consumed over the entire route. Specifically, in the related art, a route from a departure point to a destination is searched, the planned driving route that is located is divided into a plurality of segments, and a control schedule is generated in which a segment in which the operating efficiency becomes good if the vehicle drives using the engine as the drive source is set as a segment in which the engine is used as the drive source for driving, and a segment in which the operating efficiency becomes poor if the vehicle drives using the engine as the drive source is set as a segment in which the motor is used as the drive source for driving.

SUMMARY

With the technology that is described in Japanese Patent Application Publication No. JP-A-2000-333305 (pages 4 to 6 and FIGS. 3 to 6), it is possible to generate a control schedule for reducing the amount of fuel that is consumed with respect to the planned driving route that has already been set. The amount of fuel consumed over the entire route becomes minimum when the entire route is driven using only the motor as the drive source. However, in a case where the planned driving route includes a segment in which a large driving force is required, such as a steep slope, it is necessary to operate the engine in order to drive with good efficiency in that segment. In this sort of case, with the technology that is described in Japanese Patent Application Publication No. JP-A-2000-333305 (pages 4 to 6 and FIGS. 3 to 6), it is not possible to provide guidance for a route other than the planned driving route that has been set, even if a route exists on which it is possible to drive to the destination using only the motor as the drive source.

In order to address the known problems that are described above, exemplary implementations of the broad inventive principles described herein provide route guidance devices, methods, and programs that provide guidance for a vehicle that is provided with a drive motor and an engine as drive sources. The devices, methods, and programs acquire a departure point and a destination for the vehicle and specify one or more motor drive recommended links for which driving with the drive motor as the drive source is recommended. The devices, methods, and programs specify a route that includes only motor drive recommended links and by which the vehicle can drive from the departure point to the destination using only the drive motor as the drive source and output the specified route on a display.

DETAILED DESCRIPTION OF EXEMPLARY IMPLEMENTATIONS

Hereinafter, an exemplary route guidance device will be explained in detail with reference to the drawings, based on an example that is reduced to practice in a navigation device.

Figure 1:
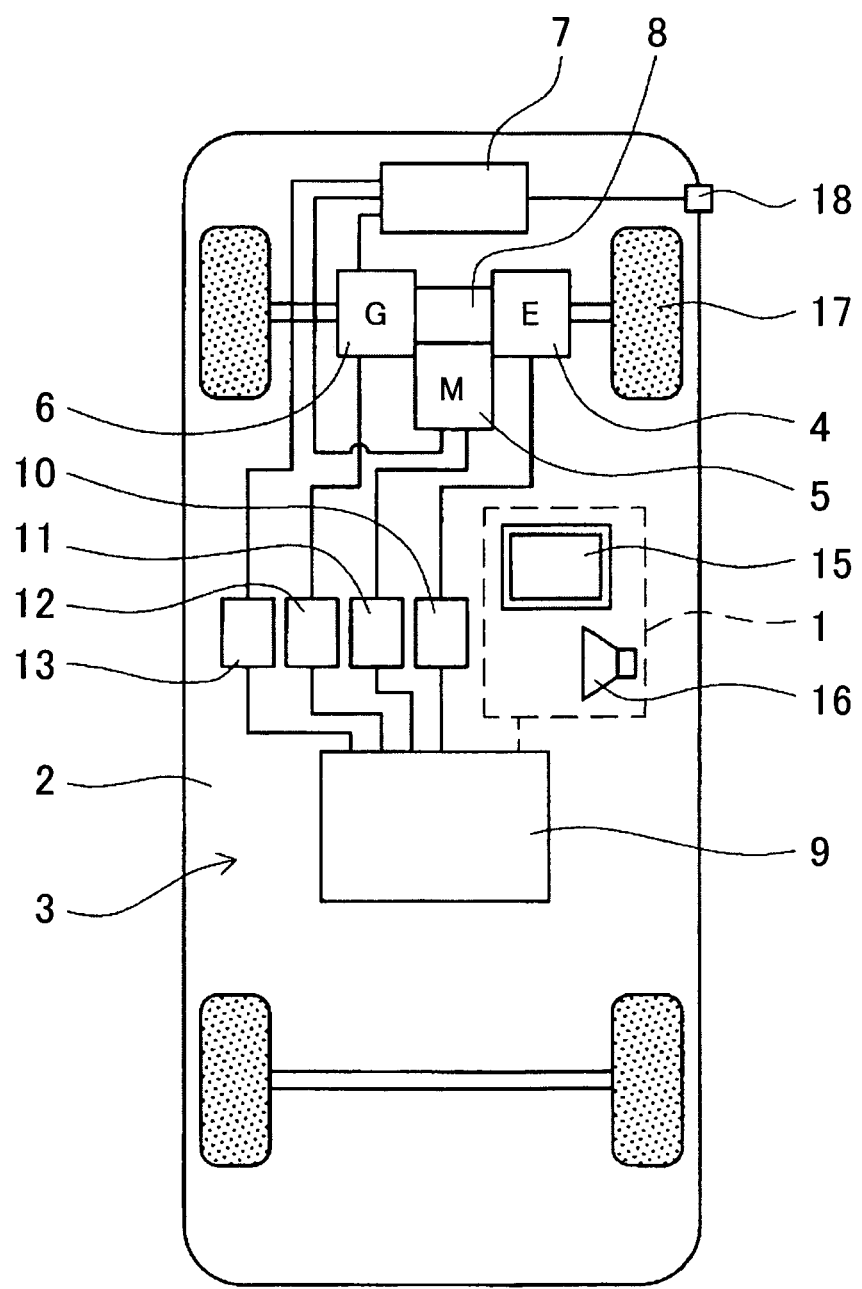
FIG. 1 is a schematic configuration diagram of a vehicle and a vehicle control system according to an example.
Figure 2:
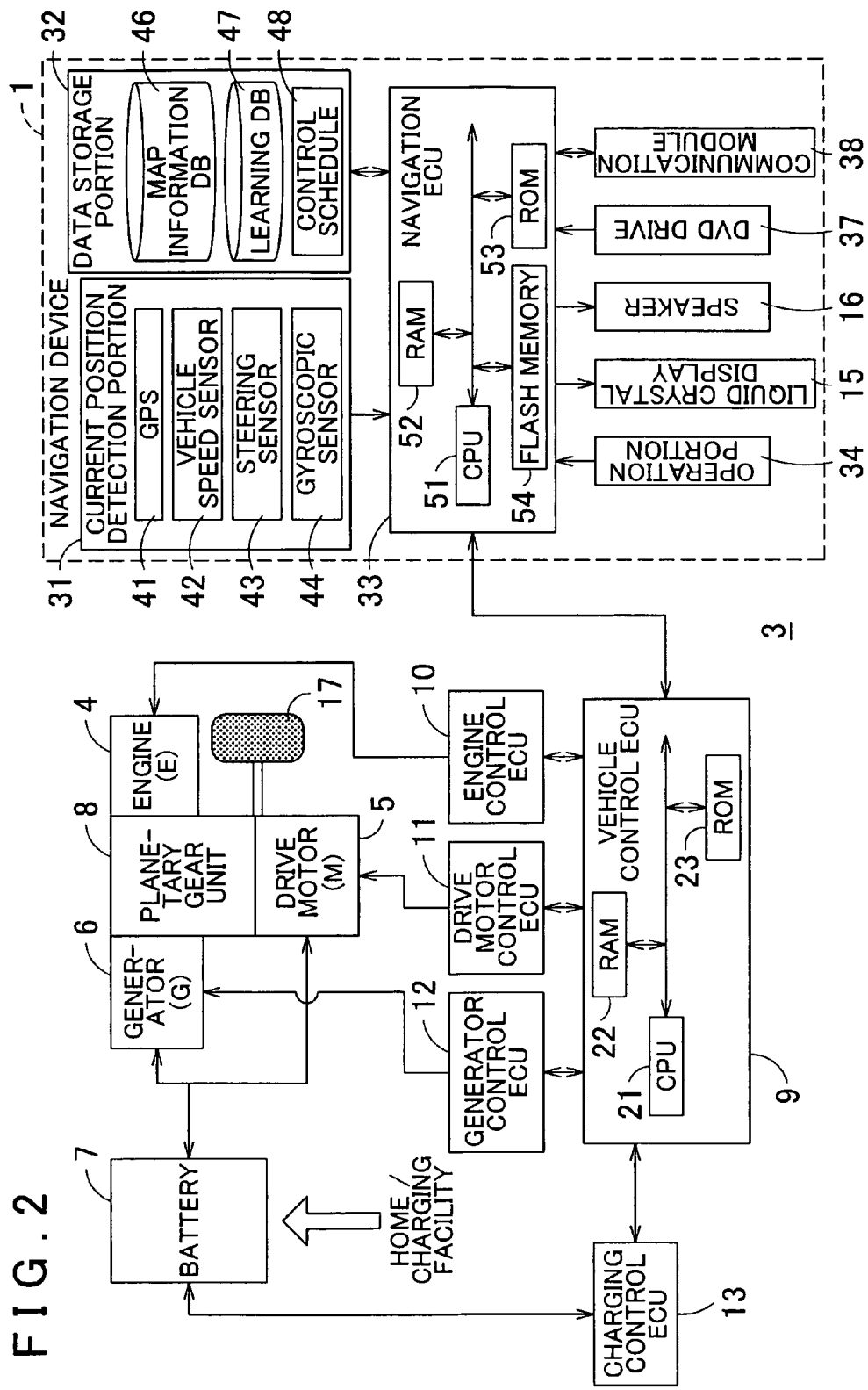
FIG. 2 is a block diagram that schematically shows a control system of the vehicle control system according to the present example.

First, a general configuration of a vehicle control system 3 for a vehicle 2 in which a navigation device 1 according to the present example is installed as an on-board device will be explained using FIGS. 1 and 2. FIG. 1 is a schematic configuration diagram of the vehicle control system 3 according to the present example, and FIG. 2 is a block diagram that schematically shows a control system of the vehicle control system 3 according to the present example. Note that the vehicle 2 is a hybrid vehicle in which both a motor and an engine are used as drive sources. Specifically, in the example that is explained below, a plug-in hybrid vehicle with a battery that can be charged from an external electric power supply is used.

As shown in FIGS. 1 and 2, the vehicle control system 3 according to the present example is basically configured from a navigation device 1 that is installed in the vehicle 2, an engine 4, a drive motor 5, a generator 6, a battery 7, a planetary gear unit 8, a vehicle control ECU 9, an engine control ECU 10, a drive motor control ECU 11, a generator control ECU 12, and a charging control ECU 13.

Here, the navigation device 1 is provided on one of a center console and a panel surface in the cabin of the vehicle 2 and is provided with a liquid crystal display 15 that displays a map of the vehicle's surroundings and a planned driving route to a destination and with a speaker 16 that outputs voice guidance that pertains to route guidance. In addition to using a GPS or the like to specify the current position of the vehicle 2, the navigation device 1, in a case where a destination has been set, searches for a route to the destination and uses the liquid crystal display 15 and the speaker 16 to provide guidance in accordance with the planned driving route that is set. Further, as will be described later, the navigation device 1, when performing the search for a route to the destination, gives priority to setting, as the planned driving route, a route by which the vehicle 2 can drive from a departure point to the destination using only the motor as the drive source. In addition, for each route that becomes a candidate for the planned driving route (except for a route by which the vehicle 2 can drive from the departure point to the destination using only the motor as the drive source), the navigation device 1 computes, in relation to the total length of the route, a ratio of route segments that the vehicle 2 can drive using only the motor as the drive source. Furthermore, based on route information about the planned driving route for the vehicle 2 and on vehicle information, the navigation device 1 generates a control schedule that controls the drive sources (the engine 4 and the drive motor 5) of the vehicle 2 during driving on the planned driving route (except in a case where a route by which the vehicle 2 can drive from the departure point to the destination using only the motor as the drive source has been set as the planned driving route). Note that the configuration of the navigation device 1 will be described in detail later.

The engine 4 is an engine such as an internal combustion engine or the like that is driven by a fuel such as gasoline, diesel oil, ethanol, or the like, and used as a first drive source of the vehicle 2. The engine torque that is the driving force of the engine 4 is transmitted to the planetary gear unit 8, and a drive wheel 17 is rotated by a portion of the engine torque that is distributed by the planetary gear unit 8, such that the vehicle 2 is driven.

The drive motor 5 is a motor that performs rotary movement based on electric power that is supplied from the battery 7, and used as a second drive source of the vehicle 2. The drive motor 5 is driven by the electric power that is supplied from the battery 7 and generates a drive motor torque that is the torque of the drive motor 5. The drive wheel 17 is also driven by the drive motor torque, such that the vehicle 2 is driven.

In particular, in the plug-in hybrid vehicle according to the present example, in a case where a control schedule 48 that is described later is set in the navigation device 1, the engine 4 and the drive motor 5 are basically controlled based on the control schedule 48 that has been set. Specifically, in an EV driving segment that is designated in the control schedule 48, what is called EV driving is performed, in which the vehicle 2 is driven using only the drive motor 5 as the drive source. Furthermore, in an HV driving segment that is designated in the control schedule 48, what is called HV driving is performed, in which the vehicle 2 is driven using both the engine 4 and the drive motor 5 as the drive sources.

On the other hand, in a case where the control schedule 48 has not been set in the navigation device 1, EV driving is basically performed until the amount of energy remaining in the battery 7 becomes not greater than a specified value. HV driving is then performed after the amount of energy remaining in the battery 7 has become not greater than a specified value.

Furthermore, when engine braking is required and when the vehicle 2 has been braked to a stop, the drive motor 5 functions as a regenerative brake and regenerates the vehicle's inertial energy as electrical energy.

The generator 6 is driven by a portion of the engine torque that is distributed by the planetary gear unit 8 and is a generating device that generates electric power. The generator 6 is also connected to the battery 7 through a dedicated inverter that is not shown in the drawings, and the generated alternating current is converted into direct current, and the direct current converted is supplied to the battery 7. Note that the drive motor 5 and the generator 6 may also be configured as a single unit.

The battery 7 is a secondary battery that serves as an electrical storage unit that can be repeatedly charged and discharged. A lead storage battery, a capacitor, a nickel-cadmium battery, a nickel-hydrogen battery, a lithium ion battery, a sodium-sulfur battery, or the like is used for the battery 7. The battery 7 is also connected to a charging connector 18 that is provided on a sidewall of the vehicle 2. It is possible to charge the battery 7 by connecting the charging connector 18 to an electric power supply source, such as an outlet or the like, at home or at a charging facility that is provided with specified charging equipment. The battery 7 is also charged by the regenerated electric power that is generated by the drive motor 5 and by the electric power that is generated by the generator 6.

The planetary gear unit 8 is configured from a sun gear, a pinion, a ring gear, a carrier, and the like, and distributes a portion of the driving force from the engine 4 to the generator 6 and transmits the remaining driving force to the drive wheel 17.

The vehicle control electronic control unit (ECU) 9 is an electronic control unit that performs overall control of the vehicle 2. The engine control ECU 10 for performing control of the engine 4, the drive motor control ECU 11 for performing control of the drive motor 5, the generator control ECU 12 for performing control of the generator 6, and the charging control ECU 13 for performing control of the battery 7 are connected to the vehicle control ECU 9, and the vehicle control ECU 9 is connected to a navigation ECU 33 that is provided in the navigation device 1 and will be described later.

The vehicle control ECU 9 is also provided with a CPU 21 that serves as a computation device and a control device, as well as with internal storage devices such as a RAM 22, a ROM 23, and the like. The RAM 22 is used as a working memory when the CPU 21 performs various types of computational processing, and the ROM 23 stores a control program and the like.

Furthermore, each of the engine control ECU 10, the drive motor control ECU 11, the generator control ECU 12, and the charging control ECU 13 is configured from a CPU, a RAM, a ROM, and the like that are not shown in the drawings, and they perform control of the engine 4, the drive motor 5, the generator 6, and the battery 7, respectively.

Next, a configuration of the navigation device 1 will be explained using FIG. 2.

As shown in FIG. 2, the navigation device 1 according to the present example is configured from a current position detection portion 31, a data storage portion 32, a controller (e.g., navigation ECU 33), an operation portion 34, the liquid crystal display 15, the speaker 16, a DVD drive 37, and a communication module 38. The current position detection portion 31 detects the current position of the vehicle 2. The data storage portion 32 stores various types of data. The navigation ECU 33 (a vehicle information acquisition unit, a motor drive recommended link specification unit, an amount of remaining battery energy acquisition unit, a route specification unit, a route guidance unit, a driving force estimation unit, an amount of required energy estimation unit) performs various types of computational processing based on information that is input. The operation portion 34 accepts an operation from a user. The liquid crystal display 15 displays for the user the map of the vehicle's surroundings and the planned driving route that has been set. The speaker 16 outputs voice guidance that pertains to route guidance. The DVD drive 37 reads a DVD that is a storage medium that stores a program. The communication module 38 performs communication with an information center such as a probe center, a VICS center, or the like.

Hereinafter, individual constitutional elements that constitute the navigation device 1 will be explained in order.

The current position detection portion 31 is configured from a GPS 41, a vehicle speed sensor 42, a steering sensor 43, a gyroscopic sensor 44, and the like, and capable of detecting a current position and heading of the vehicle 2, a driving speed of the vehicle 2, the current time, and the like. The vehicle speed sensor 42, in particular, is a sensor for detecting the travel distance and the vehicle speed of the vehicle 2. The vehicle speed sensor 42 generates pulses in response to the rotation of the drive wheel 17 of the vehicle 2 and outputs a pulse signal to the navigation ECU 33. The navigation ECU 33 then computes the revolution speed of the drive wheel 17 and the travel distance by counting the generated pulses. Note that it is not necessary for the navigation device 1 to include all of the four types of sensors that are described above, and the navigation device 1 may also be configured so as to include only one or more of the sensors described above.

The data storage portion 32 is configured from a hard disk (not shown in the drawings) that serves as an external storage device and a storage medium, and from a recording head (not shown in the drawings), which is a driver for reading a map information database 46, a learning database 47, the control schedule 48, a specified program, and the like that are stored on the hard disk, as well as for writing specified data to the hard disk.

The map information database 46 is a storage unit in which are stored, for example, link data that pertain to roads (links), node data that pertain to node points, map display data for displaying a map, intersection data that pertain to intersections, search data for searching for a route, facility data that pertain to facilities, search data for searching for a location, and the like. Note that information that pertains to sloping segments (including information (a grade and the like) that pertains to an angle of a slope) and information that pertains to curves (including information that pertains to a starting point, an ending point, and a radius of curvature) are also included in the link data.

The learning database 47 is a database that stores various types of learning data that are computed based on a past driving history of the vehicle 2. Note that in the present example, the learning data that are stored in the learning database 47 include, for each link that the vehicle 2 has driven in the past, "the driving force that is required when the vehicle 2 drives the link" and "the amount of energy that is required when the vehicle 2 drives the link."

Note also that "the driving force that is required when the vehicle 2 drives the link" is computed by the method that is hereinafter described. First, every time the link is driven, the navigation ECU 33 computes the driving force that is generated when the vehicle 2 drives the link, based on vehicle speed data and acceleration data for the vehicle 2, the grade of the link, and various types of parameters of the vehicle 2 (the frontal projected area, the inertial weight of the drive mechanism, the vehicle weight, the rolling resistance coefficient of the drive wheel, the air resistance coefficient, the cornering resistance, and the like) at the time the vehicle drives the link. The highest value of the computed driving force is then presumed to be "the driving force that is required when the vehicle 2 drives the link" and is stored as such.

Note that in a case where the vehicle 2 has driven the same link a plurality of times, the mean value of the highest stored values for the driving forces for all the times the link is driven is computed. The computed mean value is then presumed to be "the driving force that is required when the vehicle 2 drives the link" and is stored as such.

In the computing of the driving force that is generated when the vehicle 2 drives the link, a torque T [N·m] that is generated on the axle of the drive wheel and a revolution speed N of the axle may also be used. Specifically, a sensor that detects the torque T that is generated on the axle of the drive wheel may be provided in the vehicle 2, and the torque T that is generated on the axle of the drive wheel of the vehicle 2 may be detected every time the link is driven. The torque T that is generated on the axle of the drive wheel is multiplied by the revolution speed N of the axle, and the resulting value is taken to be the driving force that is generated when the vehicle 2 drives the link. Then, the highest value of the resulting value is presumed to be "the driving force that is required when the vehicle 2 drives the link" and is stored as such.

In contrast, "the amount of energy that is required when the vehicle 2 drives the link" is computed by the method that is hereinafter described. First, every time the link is driven, the navigation ECU 33 computes the amount of energy that is required when the vehicle 2 drives the link, based on the difference between an SOC value of the battery 7 before the link is driven and the SOC value of the battery 7 after the link is driven. The computed amount of energy is then presumed to be "the amount of energy that is required when the vehicle 2 drives the link" and is stored as such.

Note that in a case where the vehicle 2 has driven the same link a plurality of times, the mean value of the stored amounts of energy for all the times the link is driven is computed. The computed mean value is then presumed to be "the amount of energy that is required when the vehicle 2 drives the link" and is stored as such.

In the computing of the amount of energy that is required when the vehicle 2 drives the link, the torque T [N·m] that is generated on the axle of the drive wheel and the revolution speed N of the axle may also be used. In this case, the driving force that is required when the vehicle 2 drives the link is multiplied by the time during which the driving force is generated, and the resulting value is taken to be a consumed amount of energy that is consumed by the drive source (the drive motor 5) while the vehicle 2 is driving. Therefore, a sensor that detects the torque T that is generated on the axle of the drive wheel is provided in the vehicle 2, and the torque T that is generated on the axle of the drive wheel of the vehicle 2 is detected every time the link is driven. The amount of energy that is required by the drive motor 5 when the vehicle 2 drives the link is computed by multiplying the torque T that is generated on the axle of the drive wheel by the revolution speed N of the axle, and then integrating the resulting value by time. The computed amount of energy is then presumed to be "the amount of energy that is required when the vehicle 2 drives the link" and is stored as such.

Note that, as will be described later, "the driving force that is required when the vehicle 2 drives the link" and "the amount of energy that is required when the vehicle 2 drives the link" are used by the navigation ECU 33 in specifying a route by which the vehicle 2 can drive from the departure point to the destination using EV driving only.

The control schedule 48 is a control schedule that, in a case where a route by which the vehicle 2 cannot drive from the departure point to the destination using only EV driving has been set as the planned driving route, is created by the navigation ECU 33 before the vehicle 2 drives the planned driving route and that determines in what manner the engine 4 and the drive motor 5 will be controlled when the vehicle 2 drives the planned driving route.

For example, for each segment of the planned driving route, the control schedule 48 sets an EV driving segment in which EV driving is performed or an HV driving segment in which HV driving is performed. Then, when the vehicle 2 drives the planned driving route, the navigation ECU 33 determines whether or not it is time to change the driving control (from EV driving to HV driving, or from HV driving to EV driving), based on the current position of the vehicle 2 and on the control schedule 48. In a case where it is determined that it is time to change the driving control, a control command that commands one of EV driving and HV driving is transmitted to the vehicle control ECU 9. If the vehicle control ECU 9 receives control command that commands EV driving, the vehicle control ECU 9 controls the drive motor 5 through the drive motor control ECU 11 and starts EV driving that uses only the drive motor 5 as the drive source.

If the vehicle control ECU 9 receives a control command that commands HV driving, the vehicle control ECU 9 controls the engine 4 and the drive motor 5 through the engine control ECU 10 and the drive motor control ECU 11, respectively, and starts HV driving that uses both the engine 4 and the drive motor 5 as the drive sources. During HV driving, charging of the battery 7 is performed in a specified segment (for example, a segment in which the vehicle 2 drives at a constant, high speed) by operating the generator 6.

On the other hand, the navigation electronic control unit (ECU) 33 is an electronic control unit that performs overall control of the navigation device 1. The control of the navigation device 1 includes guidance route setting processing, EV segment computation processing, control schedule generation processing, and the like. The guidance route setting processing, in a case where the destination has been selected, sets the planned driving route from the current position to the destination based on the link data that are stored in the map information database 46 and the learning data that are stored in the learning database 47. The EV segment computation processing, for each route that becomes a candidate for the planned driving route (except for a route by which the vehicle 2 can drive from the departure point to the destination using only EV driving), computes a ratio of EV driving segments in relation to the total length of the route. The control schedule generation processing generates the control schedule 48 that controls the drive sources (the engine 4 and the drive motor 5) of the vehicle 2 when the planned driving route is being driven (except in a case where a route by which the vehicle 2 can drive from the departure point to the destination using only EV driving has been set as the planned driving route). The navigation ECU 33 is provided with a CPU 51 that serves as a computation device and a control device, as well as with internal storage devices such as a RAM 52, a ROM 53, a flash memory 54, and the like. The RAM 52 is used as a working memory when the CPU 51 performs various types of computational processing and is also used to store route data when a route has been found. The ROM 53 stores a control program, a planned driving route search processing program (refer to FIGS. 3 and 9), and the like. The flash memory 54 stores a program that is read from the ROM 53.

The operation portion 34 is operated when the departure point is input as the driving starting point, when the destination is input as the driving ending point, and the like, and it is configured from a plurality of operation switches (not shown in the drawings), such as various types of keys and buttons. The navigation ECU 33 performs control so as to perform various types of operations, based on switch signals that are output by pressing or otherwise operating various switches. Note that the operation portion 34 may also be configured as a touch panel that is provided on a front face of the liquid crystal display 15.

A map image that includes a road, traffic information, operation guidance, an operation menu, key guidance, the planned driving route from the departure point to the destination, guidance information along the planned driving route, news, a weather forecast, the time, e-mail, a television program, and the like are displayed on the liquid crystal display 15. Furthermore, in a case where the route search for the planned driving route from the departure point to the destination has been performed, route information (the total length of the route, the time that is required to arrive at the destination, the ratio of EV driving segments in relation to the total length of the route (except for the route by which the vehicle 2 can drive from the departure point to the destination using only EV driving), and the like) is displayed for each route that becomes a candidate for the planned driving route.

The speaker 16, based on a command from the navigation ECU 33, outputs voice guidance that provides guidance for driving along the planned driving route, as well as traffic information guidance.

The DVD drive 37 is a drive that is capable of reading data that are stored in a storage medium such as a DVD and a CD. Updating and the like of the map information database 46 are performed based on the data that are read.

The communication module 38 is a communication device for receiving traffic information that is transmitted from a traffic information center, such as a Vehicle Information and Communication System (VICS (registered trademark)) center or a probe center, for example. The traffic information is made up of various types of information, such as traffic congestion information, regulation information, and traffic accident information. The communication module 38 corresponds to, for example, a mobile telephone and a DCM.

Next, a planned driving route search process will be explained based on FIGS. 3 and 9. The process may be implemented by the navigation ECU 33 executing a computer program stored in the RAM 52, ROM 53, flash memory 54, and/or the data storage portion 32. But, even though the exemplary structure of the above-described navigation device 1 may be referenced in the description, it should be appreciated that the structure is exemplary and the process need not be limited by any of the exemplary structure.

Figure 3:
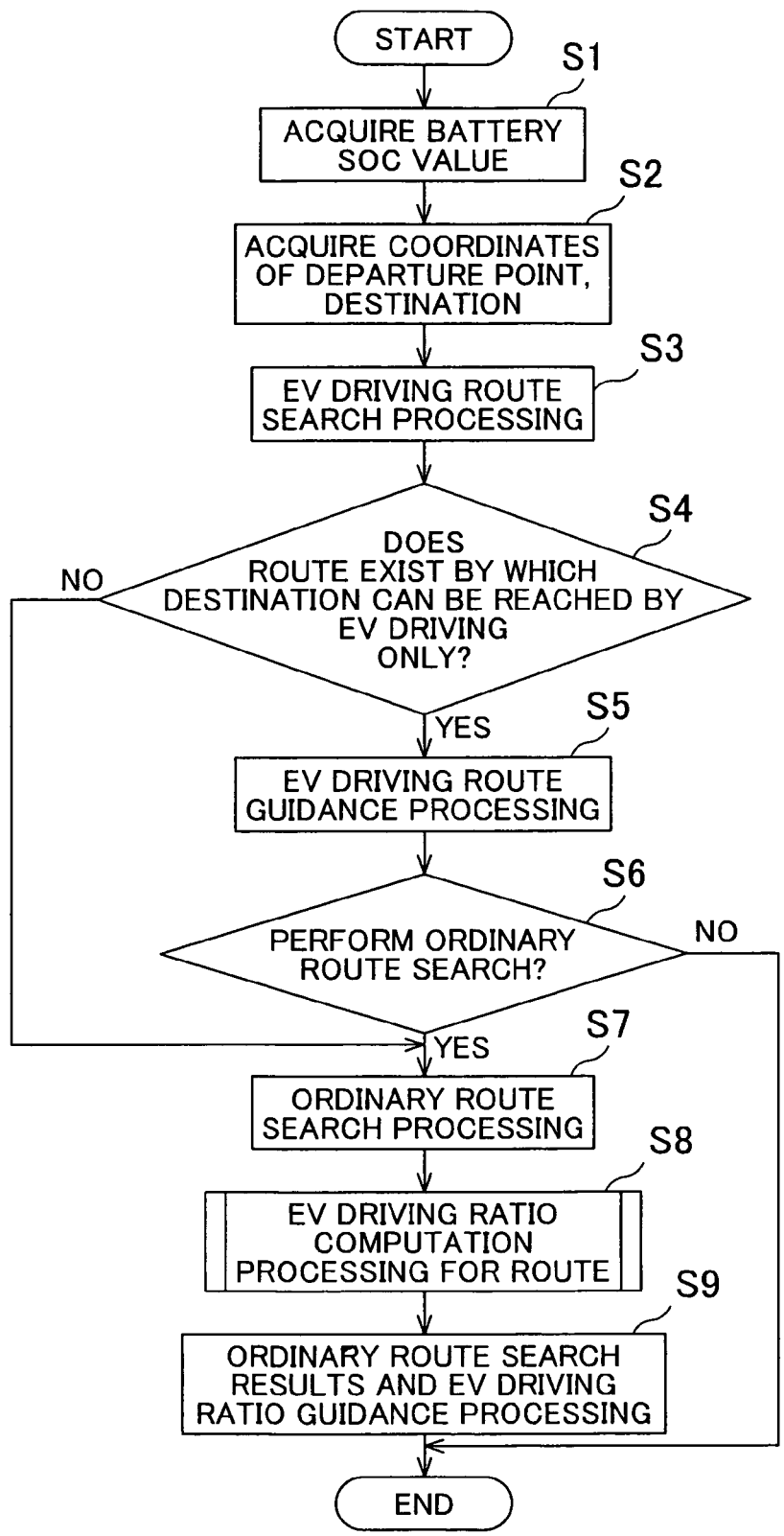
FIG. 3 is a flowchart of a planned driving route search processing program according to the present example.
Figure 9:
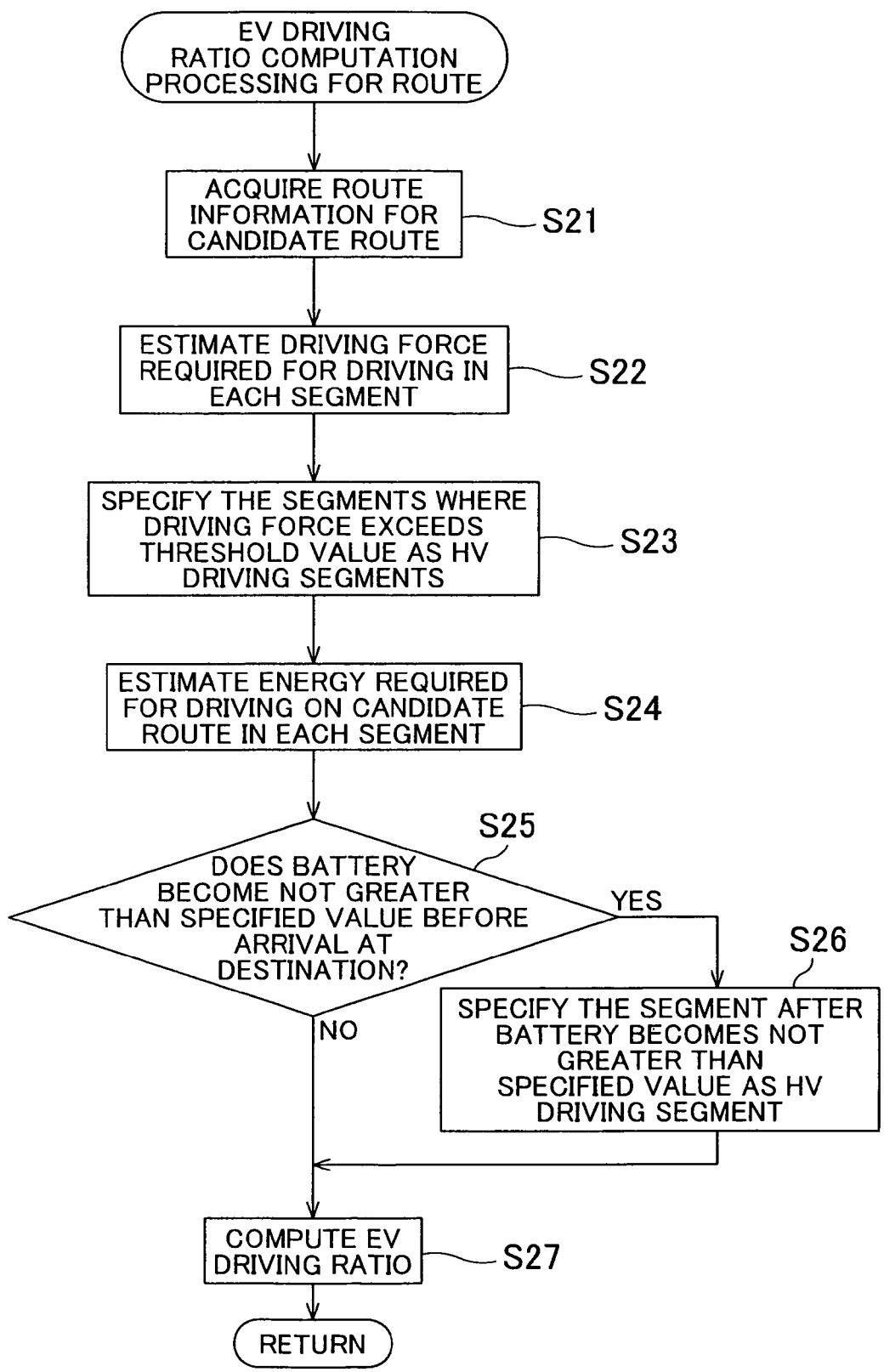
FIG. 9 is a flowchart of a sub-processing program for EV driving ratio computation processing according to the present example.

FIGS. 3 and 9 are flowcharts of the planned driving route search processing program (algorithm) according to the present example. The planned driving route search processing program is a program that is executed in a case where a specified user operation has been accepted by the operation portion 34, and that searches for the planned driving route of the vehicle 2 from the departure point to the destination and provides guidance of information that pertains to a route that becomes a candidate for the planned driving route.

In the planned driving route search processing program, at step (hereinafter abbreviated as "S") 1, the CPU 51 first acquires, from the charging control ECU 13, the SOC value of the battery 7 (the amount of energy remaining in the battery 7) that is installed in the vehicle 2.

Next, at S2, the CPU 51 acquires the coordinates of the departure point and the destination for the vehicle 2. Note that the coordinates of departure point are the coordinates of the current position of the vehicle 2 that has been detected by the current position detection portion 31. However, in a case where the departure point is specified by an operation of the operation portion 34, the coordinates are those of the specified departure point. The coordinates of the destination are the coordinates of the destination specified by an operation of the operation portion 34.

Next, at S3, the CPU 51 executes EV driving route search processing that searches for a route (hereinafter called an EV driving route) by which the vehicle 2 can drive from the departure point to the destination using only motor drive (EV driving), based on the link data that are stored in the map information database 46 and on the learning data that are stored in the learning database 47. Note that the Dijkstra method, which will be described later, is used for searching for the EV driving route.

Generally, in a hybrid vehicle, if the driving force of the vehicle 2 while the vehicle 2 is driving a link exceeds a specified threshold value, the engine 4 is operated (that is, a switch is made from EV driving to HV driving). Furthermore, if the SOC value of the battery 7 decreases to no greater than a specified value (for example, no greater than 3% of the total capacity) while the vehicle 2 is driving, it becomes difficult to continue EV driving, so the same sort of switch is made from EV driving to HV driving.

Therefore, the EV driving route is a route that is configured only from links (hereinafter called motor drive recommended links) for which it is estimated that the driving force of the vehicle 2 while the vehicle 2 is driving the links will constantly be no greater than the specified threshold value. The EV driving route is also a route on which the SOC value of the battery 7 does not decrease to no greater than the specified value (for example, no greater than 3% of the total capacity) while the vehicle 2 is driving from the departure point to the destination.

Figure 4:
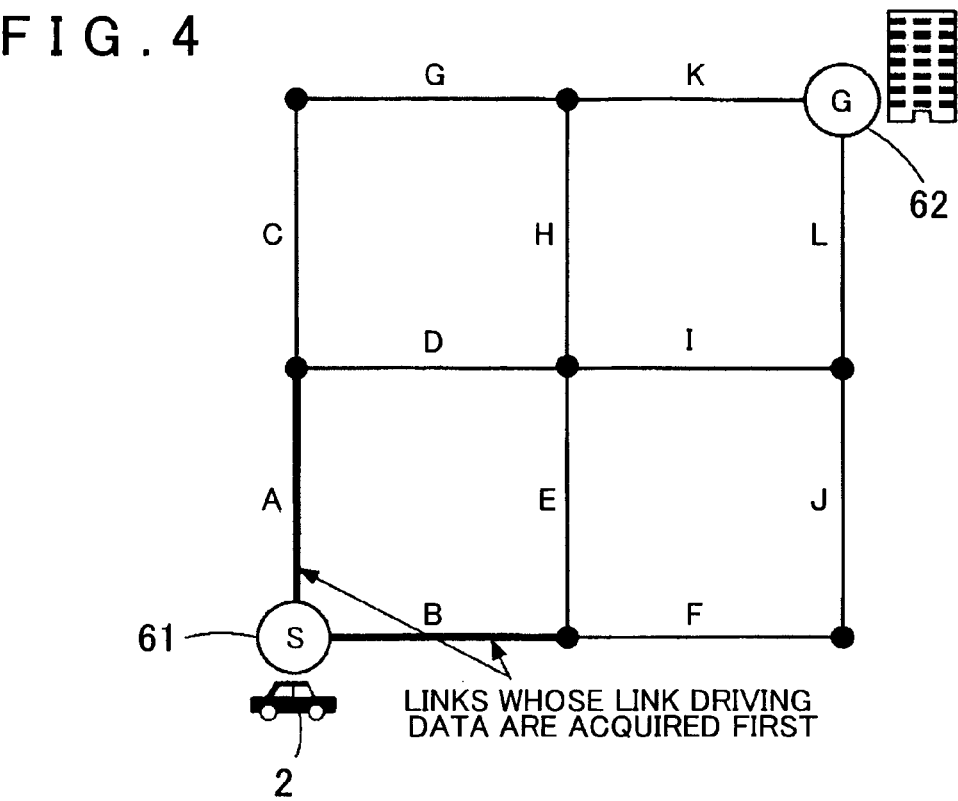
FIG. 4 is an explanatory drawing that explains EV driving route search processing.
Figure 5:
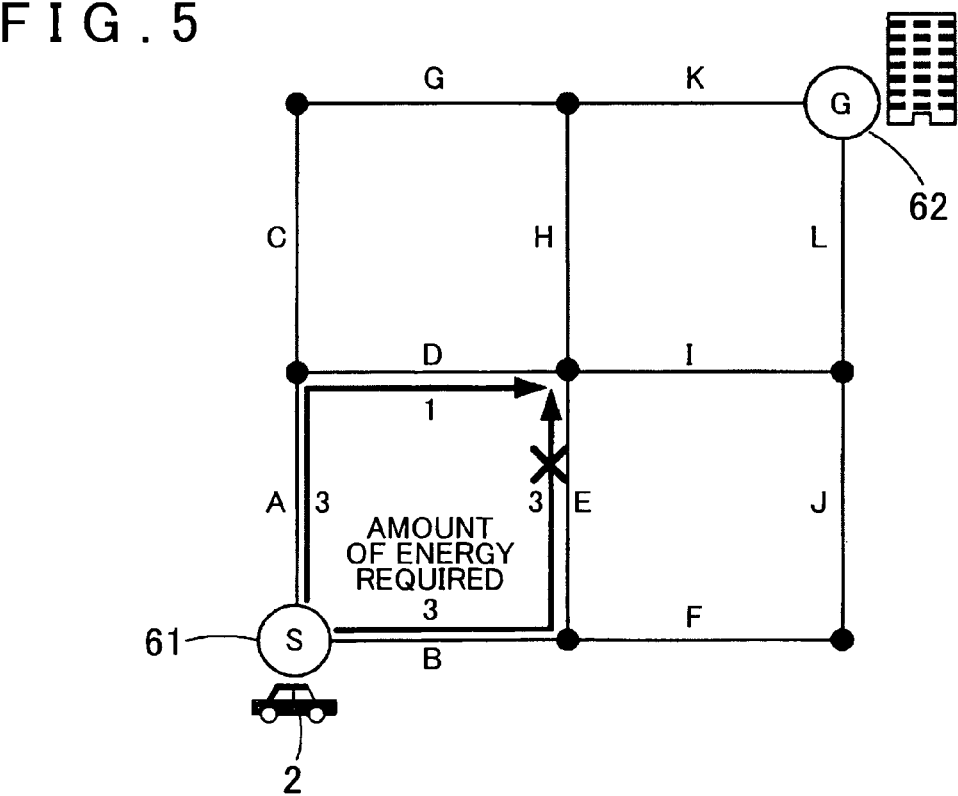
FIG. 5 is an explanatory drawing that explains the EV driving route search processing.
Figure 6:
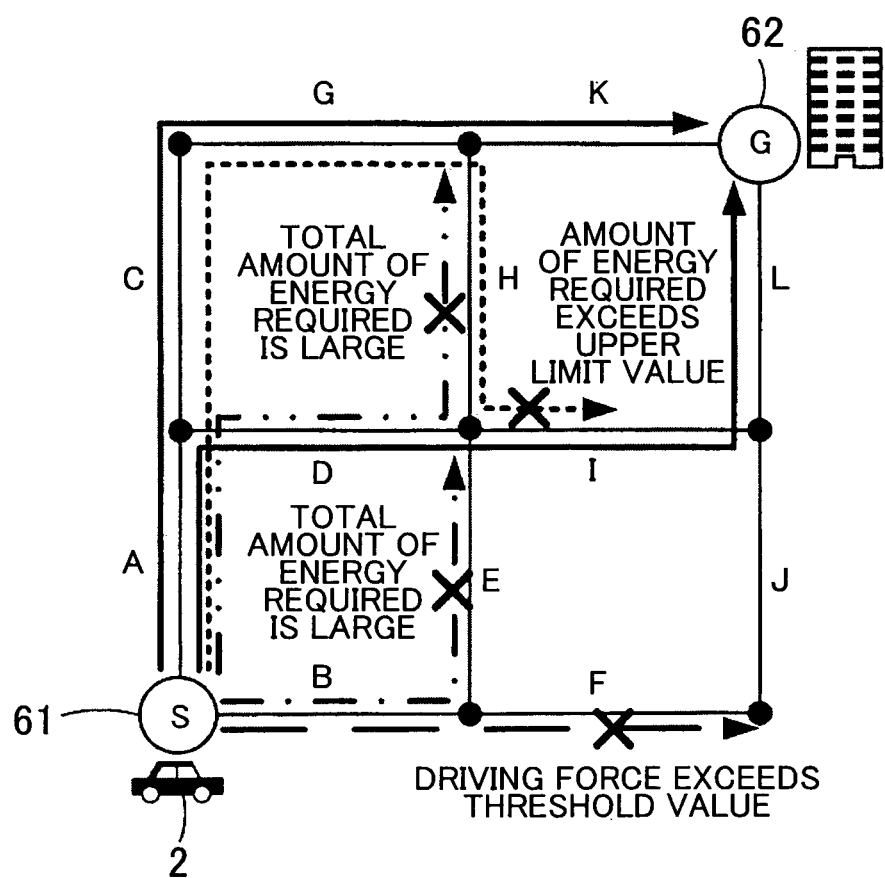
FIG. 6 is an explanatory drawing that explains the EV driving route search processing.

Hereinafter, the EV driving route search processing at S3 will be explained in detail using FIGS. 4 to 6. Note that in the example that is shown in FIGS. 4 to 6, a case is explained in which links A to L serve as links that connect a departure point 61 for the vehicle 2 to a destination 62.

First, when the EV driving route search processing is executed at S3, the CPU 51, based on the link data, specifies the links that connect to the departure point 61 (that is, link A and link B), then acquires link driving data for the links that connect to the departure point 61. Here, the link driving data that are acquired are "the driving force that is required when the vehicle 2 drives the link" and "the amount of energy that is required when the vehicle 2 drives the link." Note that the link driving data are acquired from the learning database 47. Based on the acquired link driving data, the vehicle driving force that is required in a case where the vehicle 2 drives the links that connect to the departure point 61 and the amount of energy that is required in a case where the vehicle 2 drives the links that connect to the departure point 61 are estimated.

Note that the link driving data may be acquired from a probe center through the communication module 38. In this case, the probe center is configured so as to collect, as probe data, data that pertain to the driving force that is generated and the amount of energy that is consumed when a probe car drives the link, and generate the link driving data based on the collected probe data.

The CPU 51 may also compute the link driving data based on the vehicle parameters (the frontal projected area, the inertial weight of the drive mechanism, the vehicle weight, the rolling resistance coefficient of the drive wheel the air resistance coefficient, the cornering resistance, and the like) and link data (the mean vehicle speed, the link length, the grade, and the like).

Next, based on the acquired link driving data, a determination is made as to whether or not the links that connect to the departure point 61 (that is, link A and link B) are motor drive recommended links, and a motor drive recommended link is specified from among the links that connect to the departure point 61. Specifically, in a case where the driving force that is required when the vehicle 2 drives the link is not greater than the specified threshold value, the link is specified as the motor drive recommended link. Furthermore, a link that is determined not to be the motor drive recommended link is excluded from the links that will become candidates for configuring the EV driving route (that is, a series of links that includes such a link is not specified as the EV driving route). On the other hand, the link that is specified as the motor drive recommended link is kept as the link that will become a candidate for configuring the EV driving route.

Note that the case will be explained below in which both links A and B are specified as the motor drive recommended links.

Next, the link driving data for the links that connect to link A (that is, link C and link D) are acquired. In the same manner as described above, any of the links connecting to link A that are determined not to be the motor drive recommended links are excluded from the links that will become candidates for configuring the EV driving route.

Next, the link driving data for the links that connect to link B (that is, link E and link F) are acquired. Then any of the links connecting to link B that are determined not to be the motor drive recommended links are excluded from the links that will become candidates for configuring the EV driving route.

In a case where a plurality of series of links lead to the same point (for example, the series of links that is made up of link A and link D, and the series of links that is made up of link B and link E), "the amount of energy that is required when the vehicle 2 drives the link" of each link that constitutes the series of links is totaled for each of the series of links, and the values obtained are compared between the series of links. Only the series of links for which the total is the lowest is kept as the series of links that will become a candidate for configuring the EV driving route, and the other series of links are excluded from the series of links that will become candidates for configuring the EV driving route. For example, in a case like that shown in FIG. 5, where the amount of energy that is required when the vehicle 2 drives the link A is "3," the amount of energy that is required when the vehicle 2 drives the link B is "3," the amount of energy that is required when the vehicle 2 drives the link D is "1," and the amount of energy that is required when the vehicle 2 drives the link E is "3," the total amount of energy that is required for the series of links that is made up of link A and link D is "4," which is less than the total amount of energy that is required for the series of links that is made up of link B and link E. Therefore, the series of links that is made up of link B and link E is excluded from the series of links that will become candidates for configuring the EV driving route.

Next, the link driving data for the links that connect to the links C to J are acquired in the same manner as described above, and in a case where the links that are determined not to be motor drive recommended links are excluded from the links that will become candidates for configuring the EV driving route, and a plurality of series of links lead to the same point, the series of links other than the series of links for which the total of "the amounts of energy that are required when the vehicle 2 drives the links" is the lowest are excluded from the series of links that will become candidates for configuring the EV driving route.

Furthermore, in a case where the total of "the amount of energy that is required when the vehicle 2 drives the link" of each of the links that configure a series of links exceeds an upper limit value (a value that is computed by subtracting 3% of the total capacity of the battery 7 from the SOC value of the battery 7 that has been computed at S1 above), that series of links is excluded from the series of links that will become candidates for configuring the EV driving route.

The processing that is described above is repeated until only the series of links that leads from the departure point to the destination is specified as the EV driving route.

For example, FIG. 6 is a drawing that shows the search results in a case where the EV driving route search processing at S3 is performed with respect to each series of links from the departure point 61 to the destination 62 that are shown in FIG. 4.

In the example that is shown in FIG. 6, the total of "the amounts of energy that are required when the vehicle 2 drives the links" for the series of links that is made up of link B and link E is greater than for the series of links that is made up of link A and link D that leads to the same point. Therefore, the series of links that is made up of link B and link E is excluded from the series of links that will become candidates for configuring the EV driving route. Further, the total of "the amounts of energy that are required when the vehicle 2 drives the links" for the series of links that is made up of link A, link D, and link H is greater than for the series of links that is made up of link A, link C, and link G that leads to the same point. Therefore, the series of links that is made up of link A, link D, and link H is excluded from the series of links that will become candidates for configuring the EV driving route. In addition, since the driving force that is required when the vehicle 2 drives the link F exceeds the threshold value, the series of links that includes link F is excluded from the series of links that will become candidates for configuring the EV driving route. Finally, since the total of "the amounts of energy that are required when the vehicle 2 drives the links" for the series of links that is made up of link A, link C, link G, link H, and link I exceeds the upper limit value, that series of links is excluded from the series of links that will become candidates for configuring the EV driving route.

Therefore, in the example that is shown in FIG. 6, the series of links that is made up of link A, link D, link I, and link L and the series of links that is made up of link A, link C, link G, and link K are the series of links that lead to the destination, and each series of links is specified as the EV driving route.

Next, at S4, the CPU 51 determines whether or not, as a result of the EV driving route search processing at S3, an EV driving route exists by which it is possible to drive from the departure point to the destination using only EV driving (that is, a route that is configured only from motor drive recommended links and on which the SOC value of the battery 7 will not become no greater than the specified value while the vehicle 2 is driving to the destination using EV driving only).

In a case where it is determined that the EV driving route exists (YES at S4), the processing proceeds to S5. In contrast, in a case where it is determined that the EV driving route does not exist (NO at S4), the processing proceeds to S7.

At S5, the CPU 51 provides guidance for the EV driving route that has been specified at S3, as a candidate for the planned driving route. Specifically, the total length of the EV driving route, the distance that is traveled on a toll road, the toll, the time that is required to arrive at the destination, and the like are displayed on the liquid crystal display 15. Note that the total length of the EV driving route, the distance that is traveled on a toll road, the toll, the time that is required to arrive at the destination, and the like are computed based on the link data that are stored in the map information database 46 and on traffic congestion information that is acquired from the VICS center. Furthermore, in a case where a plurality of the EV driving routes have been specified at S3, guidance is basically provided only for the EV driving route for which the time that is required to arrive at the destination is the shortest.

Note that, in a case where the plurality of the EV driving routes have been specified at S3, guidance may be provided for all of the specified EV driving routes. In that case, it is desirable for guidance to be provided for a specified number (for example, three) of the EV driving routes that are assigned the highest priorities according to a priority ranking. Note that the priority ranking may be a "ranking by the lowest toll," a "ranking by the least amount of energy that is required," a "ranking by the shortest travel distance," a "ranking by the shortest time that is required to arrive at the destination," or the like. Alternatively, the ranking that is used as the priority ranking may be selected by the user.

Figure 7:
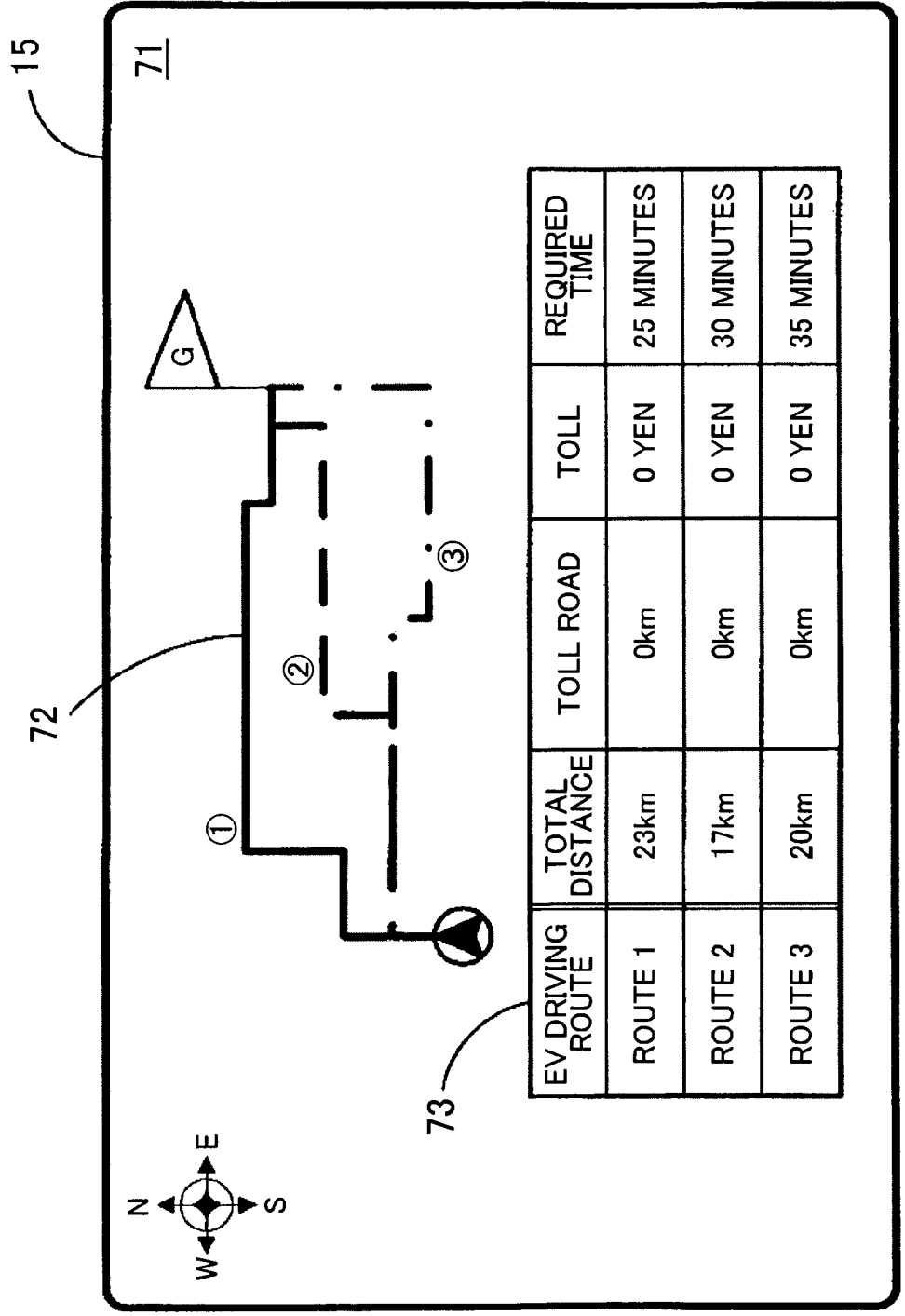
FIG. 7 is a drawing that shows an EV driving route guidance screen that is displayed on a liquid crystal display.

For example, FIG. 7 is a thawing that shows an EV driving route guidance screen 71 that is displayed on the liquid crystal display 15 at S5 in a case where three EV driving routes have been specified at S3 and the "ranking by the shortest time that is required to arrive at the destination" is used as the priority ranking.

As shown in FIG. 7, EV driving routes 72 from the departure point to the destination are displayed on the EV driving route guidance screen 71, superimposed on a map image of the vehicle's surroundings.

An information window 73 is also displayed that displays information that pertains to the total length of each of the EV driving routes, the distance that is traveled on a toll road, the toll, the time that is required to arrive at the destination, and the like. Note that the information in the information window 73 is displayed in order starting with the one of the three EV driving routes for which the time that is required to arrive at the destination is the shortest. This makes it possible to provide guidance to the user for the EV driving route by which it is possible to drive from the departure point to the destination using only EV driving.

By referring to the EV driving route guidance screen 71, the user determines whether or not to set one of the EV driving routes as the planned driving route.

Next, at S6, the CPU 51 determines whether or not to perform an ordinary route search. Note that the ordinary route search is a known route search that searches for the optimum route from the departure point to the destination based on a link cost, and does not take into consideration whether or not it is possible to drive to the destination using only EV driving. Furthermore, the determination of whether or not to perform the ordinary route search is made based on a user operation that is accepted by the operation portion 34. In other words, in a case where the user chooses to perform the ordinary route search after the guidance for the EV driving route has been provided, the determination is made to perform the ordinary route search. Note that the determination is also made to perform the ordinary route search in a case where the total length of the EV driving route that has been specified at S3 as described above is not less than a specified distance, as well as in a case where the time that is required to arrive at the destination is not less than a specified time.

In a case where it has been determined that the ordinary route search will be performed (YES at S6), the processing proceeds to S7. On the other hand, in a case where it has been determined that the ordinary route search will not be performed (NO at S6), the planned driving route search processing program is terminated. Thereafter, in a case where the user selects one of the EV driving routes for which guidance has been provided to be set as the planned driving route, the CPU 51 sets the selected route as the planned driving route and performs driving guidance based on the EV driving route that has been set as the planned driving route. Note that in a case where the EV driving route is set as the planned driving route, the control schedule is not generated.

At S7, the CPU 51 performs the ordinary route search that searches for the optimum route from the departure point to the destination based on the link cost. The ordinary route search is basically performed using the Dijkstra method. Note that since the processing at S7 is the same sort of processing as the known route search processing, an explanation thereof will be omitted.

Next, at S8, the CPU 51 performs EV driving ratio computation processing (FIG. 8) that will be described later. Note that in the EV driving ratio computation processing, the CPU 51 computes the ratio of EV driving segments in relation to the total length of the route that has been specified as the candidate for the planned driving route at S7 as described above.

Next, at S9, the CPU 51 provides guidance for the route that has been specified as the candidate for the planned driving route at S7 as described above. Specifically, the total length of the route, the distance that is traveled on a toll road, the toll, the time that is required to arrive at the destination, the ratio of the EV driving segments, and the like are displayed on the liquid crystal display 15. Note that the total length of the route, the distance that is traveled on a toll road, the toll, the time that is required to arrive at the destination, and the like are computed based on the link data that are stored in the map information database 46 and on traffic congestion information that is acquired from the VICS center. In addition, the ratio of the EV driving segments is computed at S8 as described above. In a case where the EV driving route has been specified at S3, guidance may be once again provided for the EV driving route as well.

Figure 8:
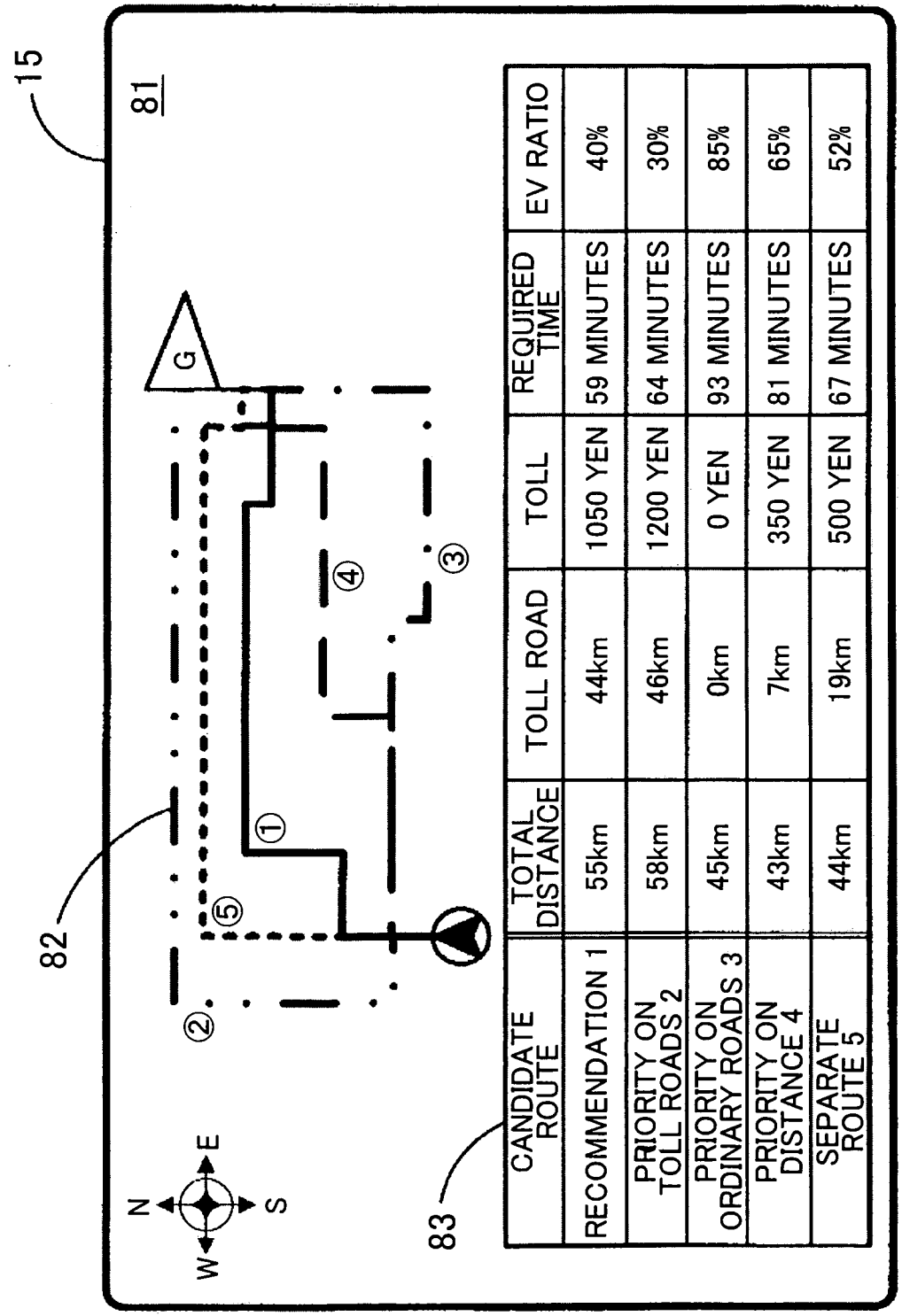
FIG. 8 is a drawing that shows a driving route guidance screen that is displayed on a liquid crystal display.

FIG. 8 is a drawing that shows a driving route guidance screen 81 that is displayed on the liquid crystal display 15 at S9 as described above in a case where, for example, five routes have been specified at S7 as candidates for the planned driving route in accordance with respectively different search conditions. Note that the example that is shown in FIG. 8 shows a case in which five different conditions, "recommendation (the priority is on making the time that is required to arrive at the destination shorter)," "priority on toll roads (the priority is on driving on toll roads)," "priority on ordinary roads (the priority is on driving on ordinary roads)," "priority on distance (the priority is on making the travel distance shorter)," and "separate route (a route other than those above)," have been set as the search condition. The CPU 51 searches for the routes that correspond to the respective conditions that have been set at S7.

As shown in FIG. 8, five routes 82 from the departure point to the destination are displayed on the driving route guidance screen 81, superimposed on a map image of the vehicle's surroundings.

An information window 83 is also displayed that displays information that pertains to the total length of the route, the distance that is traveled on a toll road, the toll, the time that is required to arrive at the destination, the EV driving ratio, and the like. This makes it possible to provide guidance to the user for the routes from the departure point to the destination and the EV driving ratios on those routes. Note that in a case where no EV driving route has been specified at S3 as described above, guidance may be provided to the effect that no EV driving route exists.

By referring to the driving route guidance screen 81, the user determines which of the routes to set as the planned driving route.

Thereafter, in a case where the user selects one of the routes for which guidance has been provided to be set as the planned driving route, the CPU 51 sets the selected route as the planned driving route and performs driving guidance based on the EV driving route that has been set as the planned driving route. Note that in a case where the EV driving route is set as the planned driving route, the control schedule is not generated. Next, sub-processing of the EV driving ratio computation processing at S8 as described above will be explained based on FIG. 9. FIG. 9 is a flowchart of a sub-processing program for the EV driving ratio computation processing.

First, at S21, the CPU 51 acquires route information about the route that has been specified as the candidate for the planned driving route (hereinafter called the candidate route) at S7 as described above. Specifically, the route information that is acquired at S21 is the link data (the link numbers, the link lengths, and the like) for the links that configure the candidate route.

Next, at S22, the CPU 51 estimates the driving force that is required when the vehicle 2 drives each of the segments (each of the links) of the candidate route that has been specified at S7 as described above. Specifically, the CPU 51 specifies each of the links that configure the candidate route, based on the link data acquired at S1 as described above, then acquires from the learning database 47 "the driving force that is required when the vehicle 2 drives each of the links." Next, based on the acquired data, the CPU 51 estimates the vehicle driving force that is required in a case where the vehicle 2 drives the candidate route separately for each of the links. Note that "the driving force that is required when the vehicle 2 drives each of the links" may be acquired from a probe center through the communication module 38.

Next, at S23, the CPU 51, based on the driving force that is estimated for each of the links at S22 as described above, identifies the link where the driving force exceeds the specified threshold value, then specifies the link as the HV driving segment in which HV driving is performed.

Figure 10:
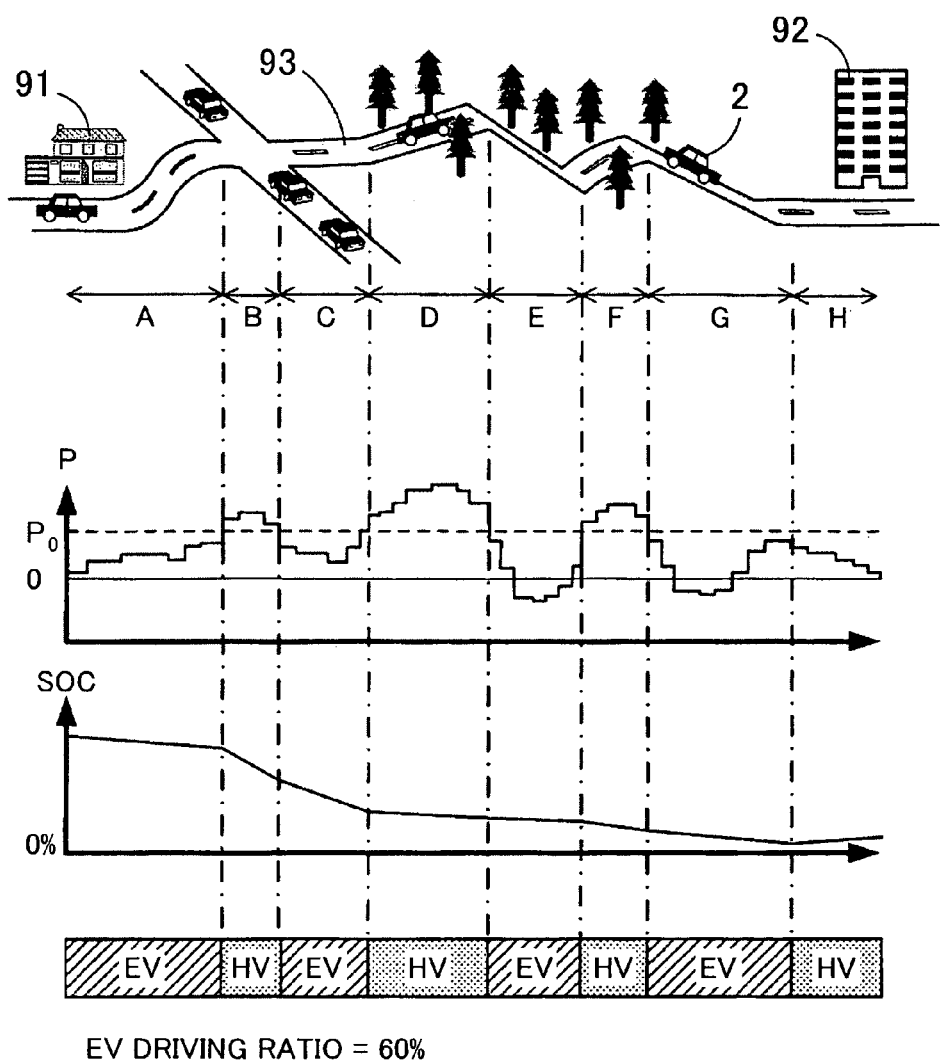
FIG. 10 is a drawing that shows a driving force and a battery SOC value of a vehicle for each link of a candidate route from a departure point to a destination, as well as an example of an HV driving segment that is specified on the candidate route.

FIG. 10 is a drawing that shows, for example, a driving force P and an SOC value of the battery 7 of the vehicle 2 for each link of a candidate route 93 from a departure point 91 to a destination 92, as well as an example of an HV driving segment that is specified on the candidate route 93.

In the example that is shown in FIG. 10, the driving force P becomes not less than a specified threshold value P0 in a segment B, a segment D, and a segment F of the candidate route 93. Therefore, the segment B, the segment D, and the segment F are specified as HV driving segments in which HV driving is performed.

Note that the CPU 51 stores information that specifies the HV driving segments that are specified at S23 as described above (the link numbers and the like for the links that configure the HV driving segments) in the RAM 52 or the like.

Next, at S24, the CPU 51 estimates the amount of energy that is required when the vehicle 2 drives each of the segments (each of the links) of the candidate route that has been specified at S7 as described above. Specifically, the CPU 51 specifies each of the links that configure the candidate route, based on the link data that have been acquired at S1 as described above, then acquires from the learning database 47 the amount of energy that is required when the vehicle 2 drives each of the links. Next, based on the acquired data, the CPU 51 estimates separately for each of the links the amount of energy that is required in a case where the vehicle 2 drives the candidate route. Note that for the segments that have been specified as the HV driving segments at S23 as described above, the amounts of energy that are required are estimated on the assumption that HV driving will be used. Note also that when the amounts of energy that are required are estimated, the amount of regenerated energy that is estimated to be accumulated in the battery 7 while the vehicle 2 is driving the candidate route is also taken into consideration. Note that "the amount of energy that is required when the vehicle 2 drives the link" may be acquired from a probe center through the communication module 38.

Next, at S25, the CPU 51 determines whether or not the SOC value of the battery 7 in the vehicle 2 will become not greater than the specified value (for example, no greater than 3% of the total capacity) before the vehicle 2 arrives at the destination when driving the candidate route, based on the amount of energy that is required when the vehicle 2 drives the candidate route, which has been estimated at S24 as described above. In a case where it is determined that the SOC value of the battery 7 in the vehicle 2 will become not greater than the specified value before the vehicle 2 arrives at the destination when driving the candidate route (YES at S25), the processing proceeds to S26. On the other hand, in a case where it is determined that the SOC value of the battery 7 in the vehicle 2 will not become the specified value or less before the vehicle 2 arrives at the destination when the vehicle 2 is driving the candidate route (NO at S25), the processing proceeds to S27.

At S26, the CPU 51 identifies the segment in which the SOC value of the battery 7 will become not greater than the specified value, then specifies that segment as an HV driving segment in which HV driving is performed. However, a regeneration segment and the EV driving segment that uses regenerated energy are not specified as the HV driving segment, even if the segments come after the SOC value of the battery 7 has become not greater than the specified value.

For example, in the example that is shown in FIG. 10, within the candidate route 93, the SOC value of the battery 7 will become not greater than the specified value at a driving termination point of segment G. Therefore, segment H that follows segment G is specified as the HV driving segment in which HV driving is performed.

Note that the CPU 51 stores information that specifies the HV driving segments that are specified at S26 as described above (the link numbers and the like for the links that configure the HV driving segments) in the RAM 52 or the like.

Next, at S27, the CPU 51 computes the ratio of the EV driving segments in relation to the total length of the candidate route that has been specified at S7 as described above. In concrete terms, if Lm is the total length of the candidate route and Xm is the total distance of the HV driving segments that have been specified at S23 and S26 as described above, then ratio Y of the EV driving segments is computed using Equation (1) below.

$$Y = \frac{(L-X)}{L} \quad (1)$$

For example, in the example that is shown in FIG. 10, the ratio of the EV driving segments in the candidate route 93 is computed to be 60%. Note that in a case where the ratio of the EV driving segments is computed at S27, guidance is provided thereafter at S9.

As explained in detail above, in the navigation device 1, the route guidance method of the navigation device 1, and the computer program that is executed by the navigation device 1 according to the present example, in the setting of the planned driving route from the departure point to the destination for the vehicle 2, a route by which the vehicle 2 can drive from the departure point to the destination using only motor drive (EV driving) is searched (S3). Specifically, in a case where a route has been located that is configured only from links for which the driving force of the vehicle 2 while the vehicle 2 is driving the links has been estimated to constantly be no greater than the specified threshold value, and that the SOC value of the battery 7 will not decrease to no greater than the specified value while the vehicle 2 is driving from the departure point to the destination by the EV driving only, guidance is provided for that route as a candidate to be set as the planned driving route (S9). Accordingly, in the hybrid vehicle 2 in which the engine 4 and the drive motor 5 serve as the drive sources, it is possible to provide guidance for a route by which the vehicle 2 can drive from the departure point to the destination using only motor drive, without operating the engine 4. Accordingly, it is therefore possible to reduce the amount of fuel that is consumed when driving to the destination, the emission gas that is emitted from the vehicle 2, and noise.

Further, because guidance is provided to a route that is configured only from links for which it has been estimated that the driving force of the vehicle 2 while the vehicle 2 is driving will be no greater than the specified threshold value, it is possible to provide guidance for a route that avoids segments that require a large driving force due to steep grades and the like. It is therefore possible to drive to the destination using only the drive motor 5 as the drive source, without operating the engine 4.

Furthermore, guidance is provided for a route by which it is possible for the vehicle 2 to drive from the departure point to the destination using only motor drive that consumes the amount of energy remaining in the battery 7, and therefore, it is possible to provide guidance for a route by which the vehicle 2 can arrive at the destination without the amount of energy remaining in the battery 7 becoming insufficient. It is therefore possible to reduce the amount of fuel that the vehicle 2 consumes, without the engine 4 being operated along the way due to battery insufficiency.

While various features have been described in conjunction with the example outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the present example, for each of the routes that are located by the ordinary route search, guidance is provided with respect to the ratio of the EV driving segments in relation to the entire route, but guidance may be provided with respect to the number of times that the engine 4 is started and time for which the engine 4 is operated. In addition, before the search processing for the EV driving route (S3) is performed, the links in which the driving force that is required when the vehicle 2 drives the links exceeds the threshold value may be excluded from the links eligible for the search in advance. In that case, the search for the EV driving route is performed by the Dijkstra method using only the remaining links. Further, flags may be provided in the link data that are stored in the map information database 46 to indicate whether or not the driving force of the vehicle 2 while the vehicle 2 is driving any given link will constantly be no greater than the specified threshold value.

What is claimed is:

1. A route guidance device for a vehicle that is provided with a drive motor and an engine as drive sources, comprising:
    a controller that:
        acquires a departure point and a destination for the vehicle;
        determines candidate links;
        estimates a driving force of the vehicle that is required for driving each candidate link;
        specifies from among the candidate links one or more motor drive recommended links for which the estimated driving force of the vehicle is not greater than a specified threshold value, the specified threshold value being a driving force value above which the engine of the vehicle must be operated in addition to the drive motor, the motor drive recommend links being links for which the vehicle can drive using only the drive motor as the drive source;
        specifies a route that includes only motor drive recommended links and by which the vehicle can drive from the departure point to the destination using only the drive motor as the drive source; and
        outputs the specified route on a display.

2. The route guidance device according to claim 1, wherein the controller:
    acquires an amount of energy remaining in a battery that supplies electric power to the drive motor; and
    specifies the route based on the acquired amount of remaining battery energy.

3. The route guidance device according to claim 1, further comprising:
    a data storage portion that stores:
        a map database; and
        a learning database including a record of each link traveled by the vehicle or a probe vehicle in the past, a driving force required to drive each link traveled by the vehicle or the probe vehicle in the past, and an amount of energy required to drive each link traveled by the or the probe vehicle in the past;
        wherein the controller specifies the one or more motor drive recommended links based on the learning database.

4. The route guidance device according to claim 1, wherein the controller:
    searches for an alternate route that includes at least one link that is not a motor drive recommended link when the route that includes only motor drive recommended links cannot be specified, or if an input is received requesting the alternate route.

5. The route guidance device according to claim 4, wherein the controller:
    calculates an EV driving ratio for the alternate route; and
    displays the EV driving ration on the display.

6. The route guidance device according to claim 1, further comprising the display.

7. A navigation device comprising the route guidance device according to claim 1.

8. A route guidance method for a vehicle that is provided with a drive motor and an engine as drive sources, comprising:
    acquiring a departure point and a destination for the vehicle;
    determining candidate links;
    estimating a driving force of the vehicle that is required for driving each candidate link;
    specifying from among the candidate links one or more motor drive recommended links for which the estimated driving force of the vehicle is not greater than a specified threshold value, the specified threshold value being a driving force value above which the engine of the vehicle must be operated in addition to the drive motor, the motor drive recommend links being links for which the vehicle can drive using only the drive motor as the drive source;
    specifying a route that includes only motor drive recommended links and by which the vehicle can drive from the departure point to the destination using only the drive motor as the drive source; and
    outputting the specified route on a display.

9. The route guidance method according to claim 8, further comprising:
    acquiring an amount of energy remaining in a battery that supplies electric power to the drive motor; and
    specifying the route based on the acquired amount of remaining battery energy.

10. The route guidance method according to claim 8, further comprising:
    accessing a map database;
    accessing a learning database including a record of each link traveled by the vehicle or a probe vehicle in the past, a driving force required to drive each link traveled by the vehicle or the probe vehicle in the past, and an amount of energy required to drive each link traveled by the or the probe vehicle in the past; and
    specifying the one or more motor drive recommended links based on the learning database.

11. The route guidance method according to claim 8, further comprising:
    searching for an alternate route that includes at least one link that is not a motor drive recommended link when the route that includes only motor drive recommended links cannot be specified, or if an input is received requesting the alternate route.

12. The route guidance method according to claim 11, further comprising:
    calculating an EV driving ratio for the alternate route; and
    displaying the EV driving ration on the display.

13. The route guidance method according to claim 8, wherein each step of the method is performed by a controller.

14. A non-transitory computer-readable storage medium storing a computer executable program usable to provide route guidance for a vehicle that is provided with a drive motor and an engine as drive sources, the program comprising:
    instructions for acquiring a departure point and a destination for the vehicle; instructions for determining candidate links;
    instructions for estimating a driving force of the vehicle that is required for driving each candidate link;
    instructions for specifying from among the candidate links one or more motor drive recommended links for which the estimated driving force of the vehicle is not greater than a specified threshold value, the specified threshold value being a driving force value above which the engine of the vehicle must be operated in addition to the drive motor, the motor drive recommend links being links for which the vehicle can drive using only the drive motor as the drive source;
    instructions for specifying a route that includes only motor drive recommended links and by which the vehicle can drive from the departure point to the destination using only the drive motor as the drive source; and instructions for outputting the specified route on a display.

\* \* \* \* \*